(12) United States Patent
Griffin et al.

(10) Patent No.: US 11,816,534 B2
(45) Date of Patent: Nov. 14, 2023

(54) HOTSWAPPING QUBITS FOR RESOURCE-LIMITED QUANTUM COMPUTING DEVICES

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 351 days.

(21) Appl. No.: 17/332,457

(22) Filed: May 27, 2021

(65) Prior Publication Data

US 2022/0383172 A1 Dec. 1, 2022

(51) Int. Cl.
*G06F 15/00* (2006.01)
*G06N 10/00* (2022.01)

(52) U.S. Cl.
CPC .................................. *G06N 10/00* (2019.01)

(58) Field of Classification Search
USPC ...................................... 706/45, 62; 716/100
See application file for complete search history.

(56) References Cited

U.S. PATENT DOCUMENTS

| | | | |
|---|---|---|---|
| 9,858,531 B1 | 1/2018 | Monroe et al. | |
| 10,592,816 B1 | 3/2020 | Hsu et al. | |
| 10,621,140 B2 | 4/2020 | Raymond | |
| 10,831,455 B2 | 11/2020 | Gambetta et al. | |
| 11,379,752 B1 * | 7/2022 | Griffin | G06N 10/80 |
| 11,494,681 B1 * | 11/2022 | Peterson | G06N 10/00 |
| 11,509,599 B1 * | 11/2022 | Nijim | G06F 9/45558 |
| 2019/0164059 A1 | 5/2019 | Denchev et al. | |
| 2020/0074346 A1 | 3/2020 | Griffin et al. | |
| 2020/0125402 A1 | 4/2020 | Griffin et al. | |
| 2022/0215279 A1 * | 7/2022 | Rahman | G06N 10/00 |
| 2022/0351062 A1 * | 11/2022 | Coady | H04L 41/5054 |

FOREIGN PATENT DOCUMENTS

JP 2019513249 A 5/2019

OTHER PUBLICATIONS

Author Unknown, "Quantum Memory Management," Microsoft, Jan. 2, 2021, https://docs.microsoft.com/en-us/azure/quantum/user-guide/language/statements/quantummemorymanagement, 4 pages.

(Continued)

*Primary Examiner* — Brian Ngo
(74) *Attorney, Agent, or Firm* — Dority & Manning, P.A.

(57) ABSTRACT

Hotswapping qubits for resource-limited quantum computing devices is disclosed. In one example, a processor device of a quantum computing device executes a first quantum service that comprises one or more qubits. The processor device receives a first request from a quantum service scheduler to allow a second quantum service to access the one or more qubits. In response to receiving the first request, the processor device suspends execution of the first quantum service. The processor device exports first metadata representing a first state of each qubit of the one or more qubits to a classical computing device. After exporting the first metadata, the processor device allocates the one or more qubits to the second quantum service, and executes the second quantum service.

20 Claims, 8 Drawing Sheets

(56) References Cited

OTHER PUBLICATIONS

Dury, B. et al., "A QUBO formulation for qubit allocation," arXiv:2009.00140v2 [quant-ph], Nov. 28, 2020, 17 pages.
Liu, L. et al., "A New Qubits Mapping Mechanism for Multi-programming Quantum Computing," Preprint, Apr. 2020, https://www.researchgate.net/publication/340963391_A_New_Qubits_Mapping_Mechanism_for_Multi-programming_Quantum_Computing, 13 pages.
Mina, M. et al., "EntangleNet: Theoretical Reestablishment of Entanglement in Quantum Networks," Applied Sciences, vol. 8, No. 10, Oct. 2018, 17 pages.
Siraichi, M. et al., "Qubit Allocation as a Combination of Subgraph Isomorphism and Token Swapping," Proceedings of the ACM on Programming Languages, vol. 3, No. OOPSLA, Article No. 120, Oct. 2019, ACM, pp. 120:1-29.

\* cited by examiner

HOTSWAPPING QUBITS FOR RESOURCE-LIMITED QUANTUM COMPUTING DEVICES

BACKGROUND

Quantum computing involves the use of quantum bits, referred to herein as "qubits," which have characteristics that differ from those of classical (i.e., non-quantum) bits used in classical computing. Qubits may be employed by quantum services that are executed by quantum computing devices. As quantum computing continues to increase in popularity and become more commonplace, an ability to efficiently utilize the limited numbers of qubits provided by resource-limited quantum computing devices will be desirable.

SUMMARY

The examples disclosed herein implement a quantum hotswapping service (QHS) that enables qubits to be "hotswapped," or dynamically reallocated between executing quantum services at runtime without loss of data or functionality. Upon receiving a request to allow a second quantum service to access one or more qubits in use by a first quantum service, the QHS creates and exports metadata representing the current state of the qubit(s), suspends the first quantum service, reallocates the qubit(s) to the second quantum service, and executes the second quantum service. In this manner, the continued safe execution of quantum services may be ensured even in circumstances in which an insufficient number of qubits are available for allocation to all executing quantum services at the same time.

In one example, a method for hotswapping qubits for resource-limited quantum computing devices is disclosed. The method comprises executing, by a quantum computing device, a first quantum service comprising one or more qubits. The method further comprises receiving, from a quantum service scheduler, a first request to allow a second quantum service to access the one or more qubits. The method also comprises, responsive to receiving the first request, suspending execution of the first quantum service. The method additionally comprises exporting first metadata representing a first state of each qubit of the one or more qubits to a classical computing device. The method further comprises allocating the one or more qubits to the second quantum service. The method also comprises executing the second quantum service.

In another example, a quantum computing device for hotswapping qubits for resource-limited quantum computing devices is disclosed. The quantum computing device comprises a system memory, and a processor device communicatively coupled to the system memory. The processor device is to execute a first quantum service comprising one or more qubits. The processor device is further to receive, from a quantum service scheduler, a first request to allow a second quantum service to access the one or more qubits. The processor device is also to, responsive to receiving the first request, suspend execution of the first quantum service. The processor device is additionally to export first metadata representing a first state of each qubit of the one or more qubits to a classical computing device. The processor device is further to allocate the one or more qubits to the second quantum service. The processor device is also to execute the second quantum service.

In another example, a non-transitory computer-readable medium is disclosed. The non-transitory computer-readable medium stores thereon computer-executable instructions that, when executed, cause one or more processor devices to execute a first quantum service comprising one or more qubits. The computer-executable instructions further cause the one or more processor devices to receive, from a quantum service scheduler, a first request to allow a second quantum service to access the one or more qubits. The computer-executable instructions also cause the one or more processor devices to, responsive to receiving the first request, suspend execution of the first quantum service. The computer-executable instructions additionally cause the one or more processor devices to export first metadata representing a first state of each qubit of the one or more qubits to a classical computing device. The computer-executable instructions further cause the one or more processor devices to allocate the one or more qubits to the second quantum service. The computer-executable instructions also cause the one or more processor devices to execute the second quantum service.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
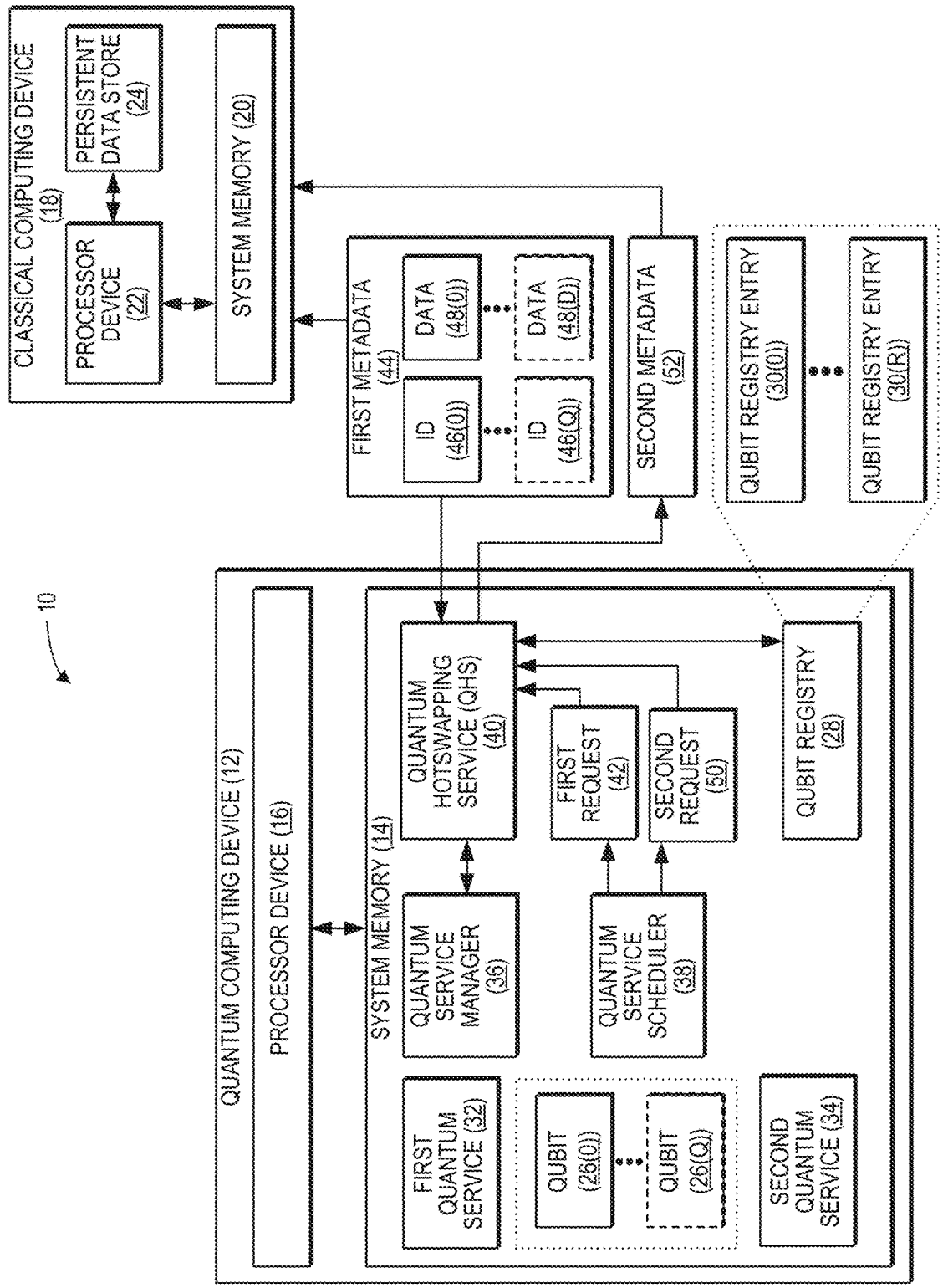
FIG. 1 is a block diagram of a computing system in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first quantum service" and "second quantum service," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing involves the use of quantum bits, referred to herein as "qubits," which have characteristics that differ from those of classical (i.e., non-quantum) bits used in classical computing. Qubits may be employed by quantum services that are executed by quantum computing devices. Because qubits generally require very specific environmental conditions for operation, the number of qubits available to quantum services that are executing on a given quantum computing device may be limited. Moreover, if qubits are assigned specific properties during execution (e.g., placed in a state of entanglement or superposition, as non-limiting examples) by a first quantum service, an attempt by a second quantum service to allocate or access those qubits may result in a disruption of those specific properties, which may cause operations of the first quantum service to fail. Thus, an ability to dynamically reallocate qubits between executing quantum services at runtime without loss of data or functionality will be desirable.

The examples disclosed herein implement a quantum hotswapping service (QHS) that enables qubits to be "hotswapped," or dynamically reallocated between executing quantum services at runtime. As used herein, the term "quantum service" and derivatives thereof refer to a process that executes on a quantum computing device, and that accesses one or more qubits to provide a desired functionality. In exemplary operation, a processor device of a quantum computing device executes a first quantum service that comprises one or more qubits. The QHS receives a first request from a quantum service scheduler to allow a second quantum service (e.g., a quantum service that is scheduled to begin execution shortly) to access the one or more qubits. This may occur, for example, in a multitasking scenario in which the first quantum service and the second quantum service are being alternately executed in an interleaved fashion by the processor device. In response to receiving the first request, the QHS suspends execution of the first quantum service (e.g., by invoking functionality of a quantum service manager, as a non-limiting example). As part of suspending execution of the first quantum service, the QHS in some examples may take steps to ensure that no data loss results from reallocation of the one or more qubits. For example, the QHS may first determine that the first quantum service has completed all operations using the one or more qubits, and/or may determine that the one or more qubits are not in a state of entanglement.

The QHS next exports first metadata representing a first state of each qubit of the one or more qubits to a classical computing device (which in some examples may store the first metadata for later retrieval). The first metadata may include any information needed to accurately and completely capture the first state of each qubit, and thus may include one or more identifiers of the qubit(s) and/or one or more data values stored by the qubit(s), as non-limiting examples. After exporting the first metadata, the QHS allocates the one or more qubits to the second quantum service (e.g., by invoking functionality of a qubit registry, as a non-limiting example), and executes the second quantum service (e.g., by invoking functionality of the qubit service manager, as a non-limiting example).

In some examples, the QHS may subsequently receive a second request from the quantum service scheduler to allow the first quantum service to resume access to the one or more qubits. In response to receiving the second request, the QHS suspends execution of the second quantum service (e.g., by invoking functionality of the quantum service manager, as a non-limiting example). The QHS exports second metadata that represents a second state of each qubit of the one or more qubits (i.e., a state of each qubit after being used by the second quantum service) to the classical computing device. The QHS then imports the first metadata from the classical computing device, and restores the first state of each qubit of the one or more qubits based on the first metadata by, for example, retrieving data values included as part of the first metadata and storing the data values in the corresponding qubit(s). After restoring the state of the qubit(s), the QHS allocates the one or more qubits to the first quantum service (e.g., by invoking functionality of the qubit registry), and resumes execution of the first quantum service (e.g., by invoking functionality of the quantum service manager).

FIG. 1 is a block diagram of a computing system 10 according to one example. The computing system 10 includes a quantum computing device 12 that comprises a first system memory 14 and a first processor device 16, and also includes a classical computing device 18 that comprises a second system memory 20 and a second processor device 22. The classical computing device 18 of FIG. 1 also includes a persistent data store 24 (e.g., a hard drive or a Solid State Drive (SSD), as non-limiting examples). The quantum computing device 12 and the classical computing device 18 in FIG. 1 are communicatively coupled via a classical communications link (not shown), which may comprise a private network or a public network such as the internet. It is to be understood that the computing system 10 according to some examples may include other quantum computing devices and/or classical computing devices that are not illustrated in FIG. 1. Additionally, the quantum computing device 12 and the classical computing device 18 in some examples may include constituent elements in addition to those illustrated in FIG. 1.

The quantum computing device 12 operates in quantum environments, but is capable of operating using classical computing principles or quantum computing principles. When using quantum computing principles, the quantum computing device 12 performs computations that utilize quantum-mechanical phenomena, such as superposition and/or entanglement states. The quantum computing device 12 may operate under certain environmental conditions, such as at or near zero degrees (0°) Kelvin. When using classical computing principles, the quantum computing device 12 utilizes binary digits that have a value of either zero (0) or one (1).

In the example of FIG. 1, the quantum computing device 12 implements a set of one or more qubits 26(0)-26(Q) for use by quantum services executed by the quantum computing device 12. To maintain information for the qubit(s) 26(0)-26(Q), the quantum computing device 12 includes a qubit registry 28, which comprises a plurality of qubit registry entries 30(0)-30(R) each corresponding to a qubit such as the one or more qubits 26(0)-26(Q). The qubit registry 28 maintains and provides access to data relating to the qubits implemented by the quantum computing device 12, such as a count of the total number of qubits implemented by the quantum computing device 12 and a count of the number of available qubits that are currently available for allocation, as non-limiting examples. Each of the qubit registry entries 30(0)-30(R) of the qubit registry 28 also stores qubit metadata (not shown) for a corresponding qubit. The qubit metadata may include, as non-limiting examples, an identifier of the corresponding qubit, an availability indicator that indicates whether the corresponding qubit is available for use or is in use by a specific quantum service, an identifier of a quantum service that is associated with the corresponding qubit or to which the corresponding qubit is allocated, and/or an entanglement indicator that indicates whether the corresponding qubit is in an entangled state.

The quantum computing device 12 of FIG. 1 executes one or more quantum services, such as a first quantum service 32 and a second quantum service 34. The first quantum service 32 and the second quantum service 34 are processes that employ qubits such as the one or more qubits 26(0)-26(Q) to provide desired functionality. Execution of quantum services such as the first quantum service 32 and the second quantum service 34 is facilitated by a quantum service manager 36 and a quantum service scheduler 38. The quantum service manager 36 of the quantum computing device 12 handles operations for creating, monitoring, and terminating quantum services, while the quantum service scheduler 38 of the quantum computing device 12 controls the scheduling of quantum services for execution by the first processor device 16, and the allocation of processing resources to executing quantum services. The functionality of the quantum service manager 36 and the quantum service scheduler 38 may be made accessible to other processes (e.g., via a defined application programming interface (API), as a non-limiting example).

Because the number of qubit(s) 26(0)-26(Q) is limited, executing quantum services such as the first quantum service 32 and the second quantum service 34 may find themselves in competition with one another for runtime allocation of the one or more of the qubit(s) 26(0)-26(Q) maintained by the quantum computing device 12. Thus, it is desirable for the quantum computing device 12 to be able to modify the allocation of the qubits 26(0)-26(Q) among the executing quantum services at runtime. For instance, in one possible use case, an organization making use of the quantum computing device 12 may seek to execute both the first quantum service 32 and the second quantum service 34 concurrently in a multitasking environment, despite the quantum computing device 12 not having a sufficient number of qubit(s) 26(0)-26(Q) to meet the needs of both the first quantum service 32 and the second quantum service 34 at the same time.

Accordingly, the quantum computing device 12 of FIG. 1 implements a QHS 40 for hotswapping qubits for resource-limited quantum computing devices. In exemplary operation, the QHS 40, while the first quantum service 32 is being executed by the first processor device 16 of the quantum computing device 12, receives a first request 42 from the quantum service scheduler 38 to allow the second quantum service 34 to access the one or more qubits 26(0)-26(Q). This may occur, for example, in a multitasking scenario in which the first quantum service 32 and the second quantum service 34 are being alternately executed in an interleaved fashion by the first processor device 16, and a processing timeslot allocated to the first quantum service 32 is ending while a processing timeslot allocated to the second quantum service 34 is beginning.

Upon receiving the first request 42, the QHS 40 suspends execution of the first quantum service 32, which in some examples may be accomplished by invoking functionality of the quantum service manager 36. In the course of suspending execution of the first quantum service 32, the QHS 40 in some examples may take steps to ensure that no data loss results from reallocation of the one or more qubits 26(0)-26(Q) from the first quantum service 32 to the second quantum service 34. Thus, for instance, the QHS 40 may first determine that the first quantum service 32 has completed all operations using the one or more qubits 26(0)-26(Q), and/or may determine that the one or more qubits 26(0)-26(Q) are not in a state of entanglement.

Next, the QHS 40 of FIG. 1 exports first metadata 44 to the classical computing device 18, which in some examples may store the first metadata 44 using the persistent data store 24 for later retrieval. The first metadata 44 represents a first state of each qubit of the one or more qubits 26(0)-26(Q), and thus may include any information needed to accurately and completely capture the first state of each qubit. For example, the first metadata 44 of FIG. 1 may include one or more identifiers (captioned as "ID" in FIG. 1) 46(0)-46(Q) of respective ones of the one or more qubits 26(0)-26(Q), and/or one or more data values (captioned as "DATA" in FIG. 1) 48(0)-48(D) that are stored by respective ones of the one or more qubits 26(0)-26(Q). After exporting the first metadata 44, the QHS 40 allocates the one or more qubits 26(0)-26(Q) to the second quantum service 34 (e.g., by invoking functionality of the qubit registry 28, as a non-limiting example). The QHS 40 then executes the second quantum service 34, which in some examples may be accomplished by invoking functionality of the quantum service manager 36.

In some examples, the QHS 40 may subsequently receive a second request 50 from the quantum service scheduler 38 to allow the first quantum service 32 to resume access to the one or more qubits 26(0)-26(Q) (for example, when the processing timeslot allocated to the second quantum service 34 is ending and a new processing timeslot allocated to the first quantum service 32 is beginning). Upon receiving the second request 50, the QHS 40 suspends execution of the second quantum service 34 (e.g., by invoking functionality of the quantum service manager 36, as a non-limiting example). The QHS 40 next exports second metadata 52 that represents a second state of each qubit of the one or more qubits 26(0)-26(Q) (i.e., a state of each qubit after being used by the second quantum service 34) to the classical computing device 18.

The QHS 40 then imports the first metadata 44 from the classical computing device 18, and restores the first state of each qubit of the one or more qubits 26(0)-26(Q) based on the first metadata 44. This may be accomplished in some examples by retrieving the data values 48(0)-48(D) that were included as part of the first metadata 44, and storing the data values 48(0)-48(D) in the corresponding qubit(s) 26(0)-26(Q). After restoring the state of the qubit(s) 26(0)-26(Q), the QHS 40 allocates the one or more qubits 26(0)-26(Q) to the first quantum service 32, which in some examples may be accomplished by invoking functionality of the qubit registry 28. The QHS 40 then resumes execution of the first quantum service 32 (e.g., by invoking functionality of the quantum service manager 36).

It is to be understood that, because the QHS 40 is a component of the quantum computing device 12, functionality implemented by the QHS 40 may be attributed to the computing system 10 generally. Moreover, in examples where the QHS 40 comprises software instructions that program the first processor device 16 to carry out functionality discussed herein, functionality implemented by the QHS 40 may be attributed herein to the first processor device 16. It is to be further understood that while, for purposes of illustration only, the QHS 40 is depicted as a single component, the functionality implemented by the QHS 40 may be implemented in any number of components, and the examples discussed herein are not limited to any particular number of components.

Figure 2A:
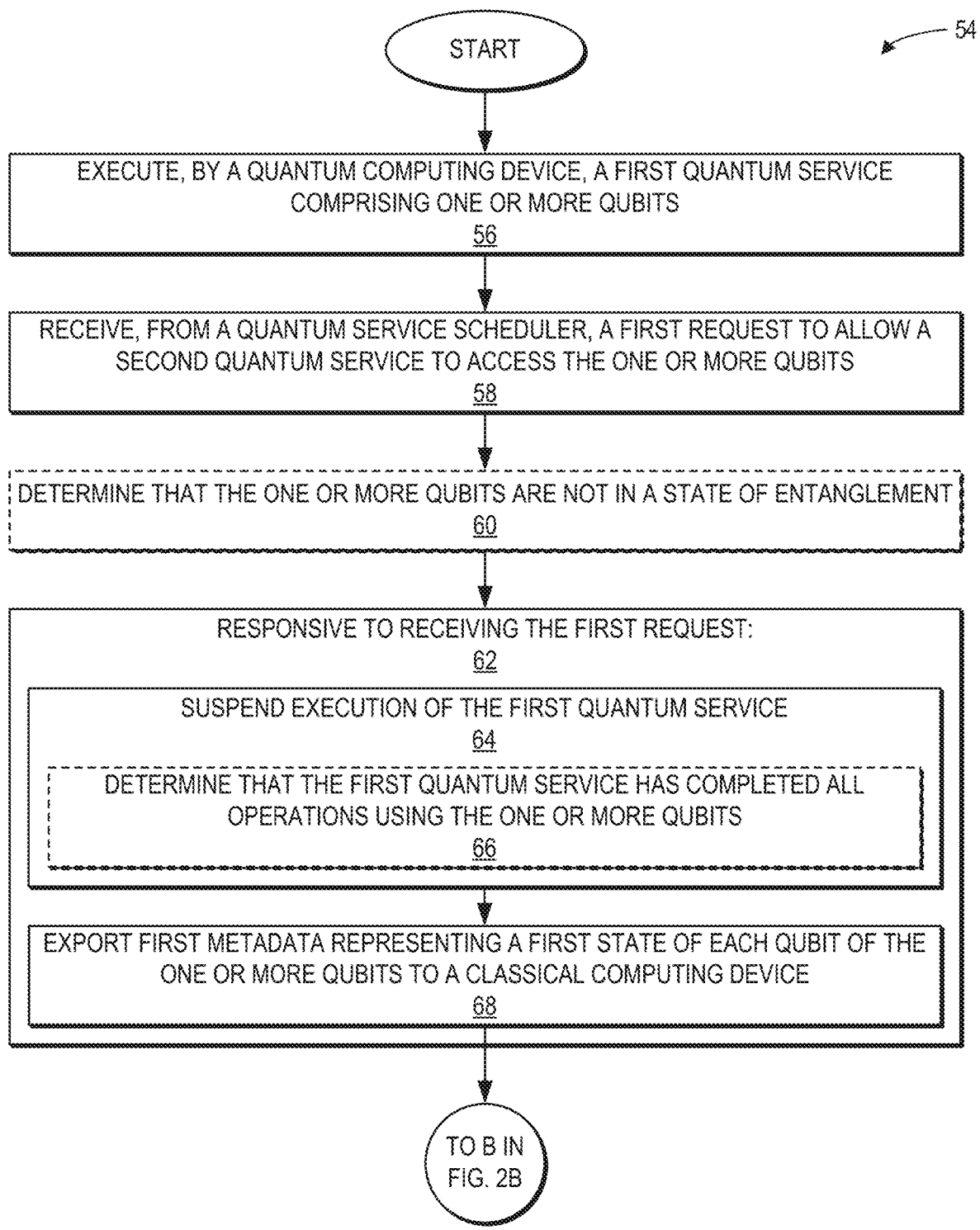
FIGS. 2A-2C are flowcharts illustrating operations performed by the computing system of FIG. 1 for hotswapping qubits for resource-limited quantum computing devices, according to one example.
Figure 2B:
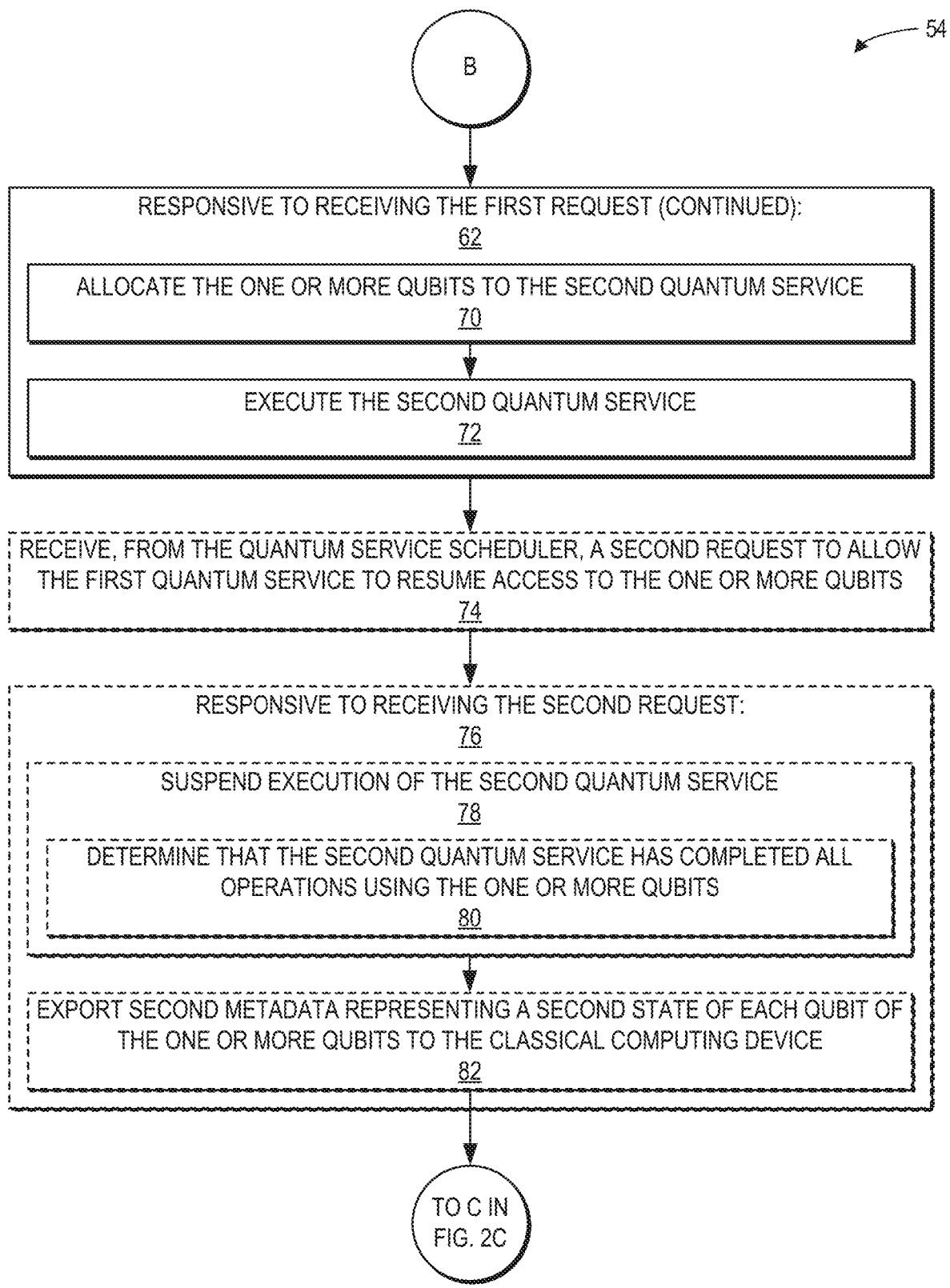
Figure 2C:
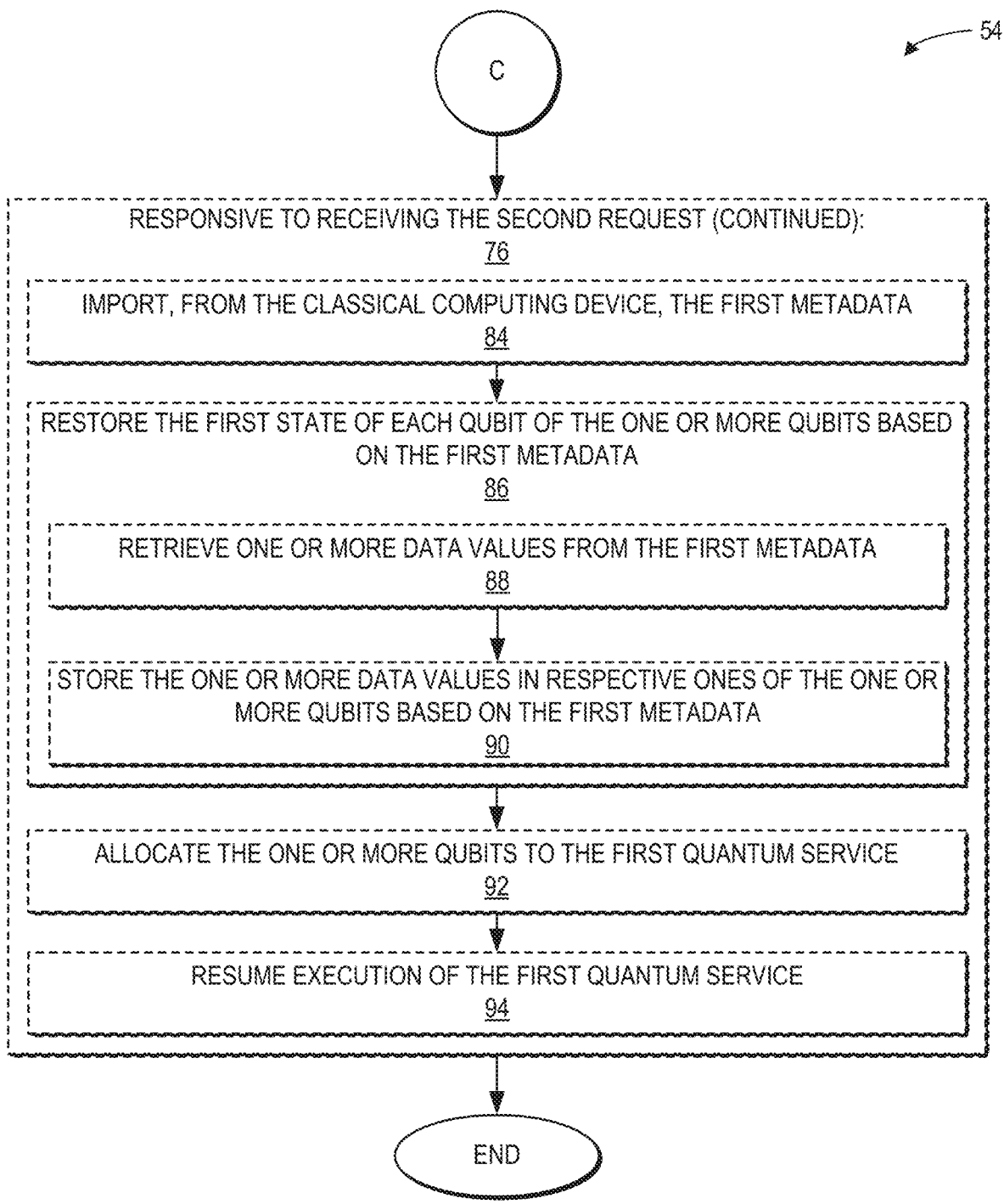

To illustrate exemplary operations performed by the computing system 10 of FIG. 1 for hotswapping qubits for resource-limited quantum computing devices according to one example, FIGS. 2A-2C provide a flowchart 54. Elements of FIG. 1 are referenced in describing FIGS. 2A-2C for the sake of clarity. In FIG. 2A, operations begin with a processor device of a quantum computing device (such as the first processor device 16 of the quantum computing device 12 of FIG. 1) executing a first quantum service comprising one or more qubits (such as the first quantum service 32 comprising the one or more qubits 26(0)-26(Q) of FIG. 1) (block 56). The first processor device 16 receives (e.g., by executing the QHS 40 of FIG. 1) the first request 42 to allow a second quantum service (such as the second quantum service 34) to access the one or more qubits 26(0)-26(Q) (block 58). In some examples, before continuing further, the first processor device 16 may determine that the one or more qubits 26(0)-26(Q) are not in a state of entanglement (block 60).

In response to receiving the first request 42, the first processor device 16 performs a series of operations (block 62). The first processor device 16 first suspends execution of the first quantum service 32 (e.g., by invoking functionality of the quantum service manager 36) (block 64). Some examples may provide that the operations of block 64 for suspending execution of the first quantum service 32 may comprise determining that the first quantum service 32 has completed all operations using the one or more qubits 26(0)-26(Q) (block 66). This may ensure that no data loss occurs as a result of hotswapping the one or more qubits 26(0)-26(Q). The first processor device 16 next exports the first metadata 44 representing a first state of each qubit of the one or more qubits 26(0)-26(Q) to the classical computing device 18 (block 68). Operations then continue at block 70 of FIG. 2B.

Referring now to FIG. 2B, the operations of block 62 performed by the first processor device 16 in response to receiving the first request 42 continue. The first processor device 16 allocates the one or more qubits 26(0)-26(Q) to the second quantum service 34 (e.g., by invoking functionality of the qubit registry 28) (block 70). The first processor device 16 then executes the second quantum service 34 (e.g., by invoking functionality of the quantum service manager 36) (block 72).

In some examples, the first processor device 16 may subsequently receive, from the quantum service scheduler 38, a second request, such as the second request 50 of FIG. 1, to allow the first quantum service 32 to resume access to the one or more qubits 26(0)-26(Q) (block 74). In response to receiving the second request 50, the first processor device 16 performs a series of operations (block 76). The first processor device 16 suspends execution of the second quantum service 34 (e.g., by invoking functionality of the quantum service manager 36) (block 78). Some examples may provide that the operations of block 78 for suspending execution of the second quantum service 34 may comprise determining that the second quantum service 34 has completed all operations using the one or more qubits 26(0)-26(Q) (block 80). The first processor device 16 next exports the second metadata 52 representing a second state of each qubit of the one or more qubits 26(0)-26(Q) to the classical computing device 18 (block 82). Operations then continue at block 84 of FIG. 2C.

Referring now to FIG. 2C, the operations of block 76 performed by the first processor device 16 in response to receiving the second request 50 continue. The first processor device 16 imports, from the classical computing device 18, the first metadata 44 (block 84). The first processor device 16 then restores the first state of each qubit of the one or more qubits 26(0)-26(Q) based on the first metadata 44 (block 86). According to some examples, the operations of block 86 for restoring the first state of each qubit of the one or more qubits 26(0)-26(Q) based on the first metadata 44 may comprise retrieving one or more data values 48(0)-48(D) from the first metadata 44 (block 88). The first processor device 16 then stores the one or more data values 48(0)-48(D) in respective ones of the one or more qubits 26(0)-26(Q) based on the first metadata 44 (block 90). The first processor device 16 next allocates the one or more qubits 26(0)-26(Q) to the first quantum service 32 (e.g., by invoking functionality of the qubit registry 28) (block 92). The first processor device 16 finally resumes execution of the first quantum service 32 (e.g., by invoking functionality of the quantum service manager 36) (block 94).

Figure 3:
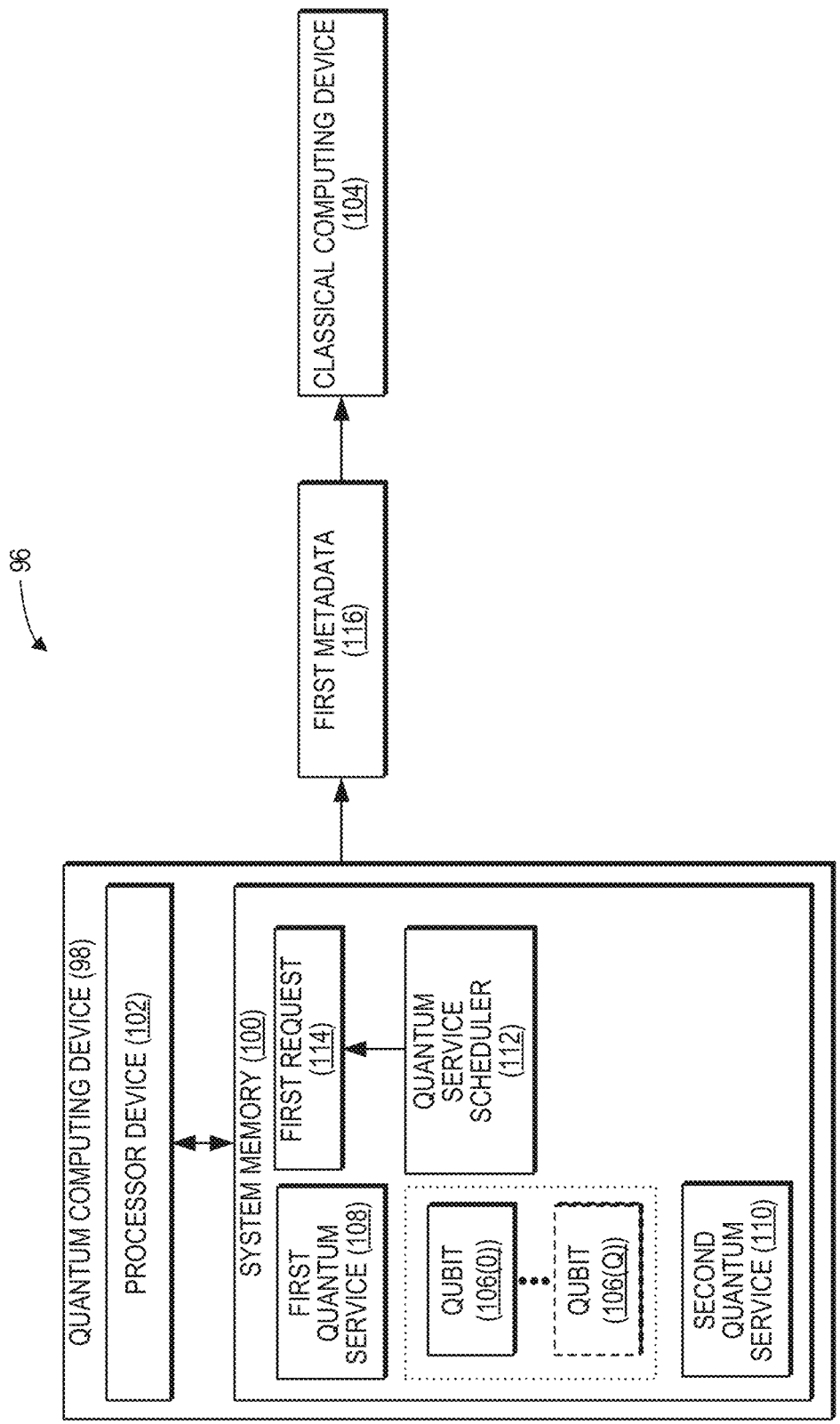
FIG. 3 is a simpler block diagram of the computing system of FIG. 1 for hotswapping qubits for resource-limited quantum computing devices, according to one example.

FIG. 3 is a simpler block diagram of the quantum computing device 12 of FIG. 1 for hotswapping qubits for resource-limited quantum computing devices, according to one example. In the example of FIG. 3, a computing system 96 includes a quantum computing device 98 that comprises a system memory 100 and a processor device 102, and also includes a classical computing device 104. The quantum computing device 98 implements a set of one or more qubits 106(0)-106(Q) for use by quantum services executed by the quantum computing device 98. The quantum computing device 98 of FIG. 3 executes one or more quantum services, such as a first quantum service 108 and a second quantum service 110, which are processes that employ qubits such as the one or more qubits 106(0)-106(Q) to provide desired functionality. Execution of quantum services such as the first quantum service 108 and the second quantum service 110 is facilitated by a quantum service scheduler 112, which controls the scheduling of quantum services for execution by the processor device 102, and the allocation of processing resources to executing quantum services.

In exemplary operation, the processor device 102 receives a first request 114 from the quantum service scheduler 112 to allow the second quantum service 110 to access the one or more qubits 106(0)-106(Q). Upon receiving the first request 114, the processor device 102 suspends execution of the first quantum service 108, and exports first metadata 116 to the classical computing device 104. After exporting the first metadata 116, the processor device 102 allocates the one or more qubits 106(0)-106(Q) to the second quantum service 110, and then executes the second quantum service 110.

Figure 4:
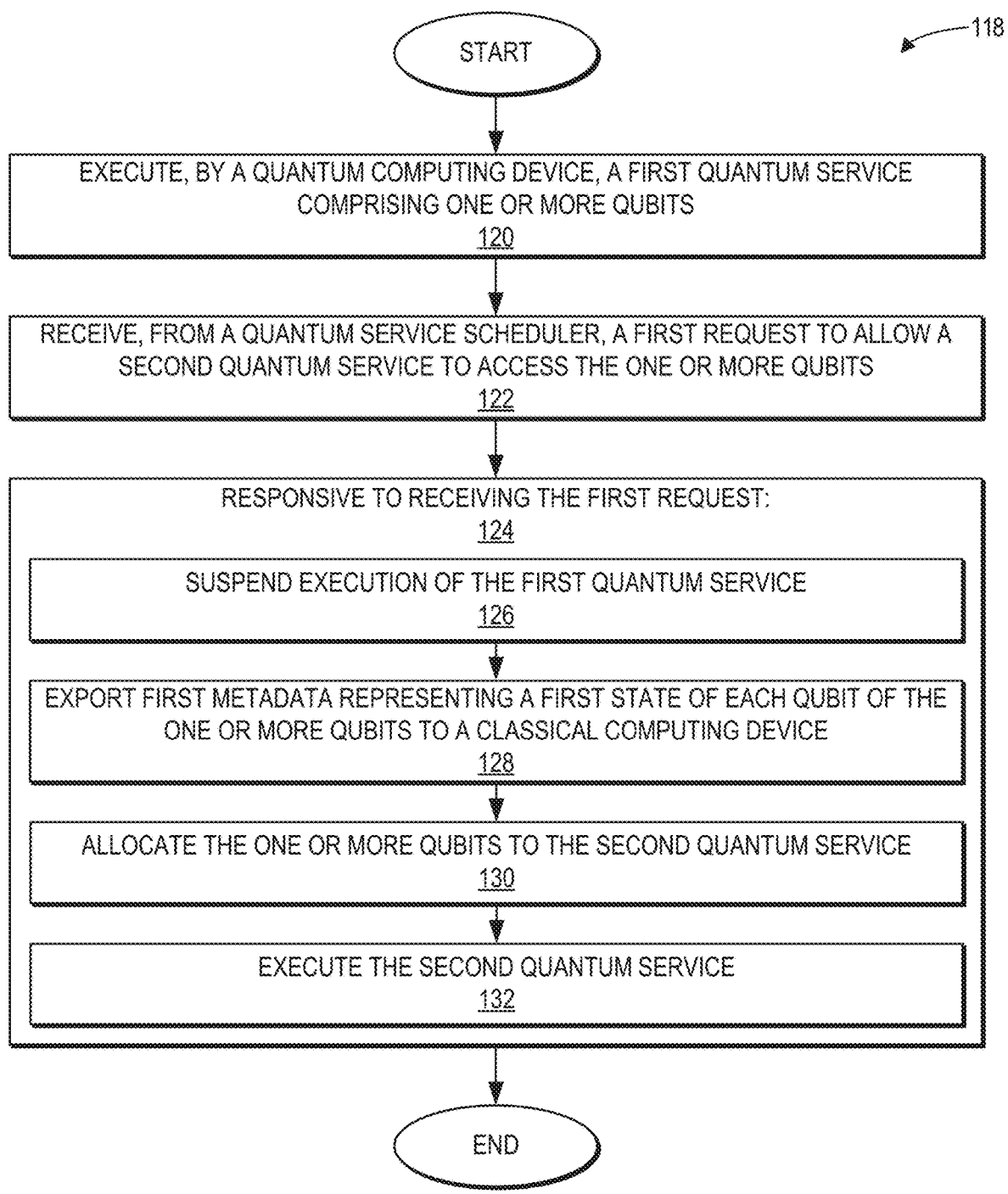
FIG. 4 is a flowchart of a simplified method for hotswapping qubits for resource-limited quantum computing devices by the quantum computing device of FIG. 3, according to one example.

FIG. 4 provides a flowchart 118 of a simplified method for hotswapping qubits for resource-limited quantum computing devices by the quantum computing device 98 of FIG. 3, according to one example. For the sake of clarity, elements of FIG. 3 are referenced in describing FIG. 4. Operations in FIG. 4 begin with the quantum computing device 98 executing the first quantum service 108 comprising one or more qubits 106(0)-106(Q) (block 120). The quantum computing device 98 receives, from the quantum service scheduler 112, the first request 114 to allow the second quantum service 110 to access the one or more qubits 106(0)-106(Q) (block 122). In response to receiving the first request 114, the quantum computing device 98 performs a series of operations (block 124). The quantum computing device 98 suspends execution of the first quantum service 108 (block 126). The quantum computing device 98 exports the first metadata 116 representing a first state of each qubit of the one or more qubits 106(0)-106(Q) to the classical computing device 104 (block 128). The quantum computing device 98 then allocates the one or more qubits 106(0)-106(Q) to the second quantum service 110 (block 130). The quantum computing device 98 executes the second quantum service 110 (block 132).

Figure 5:
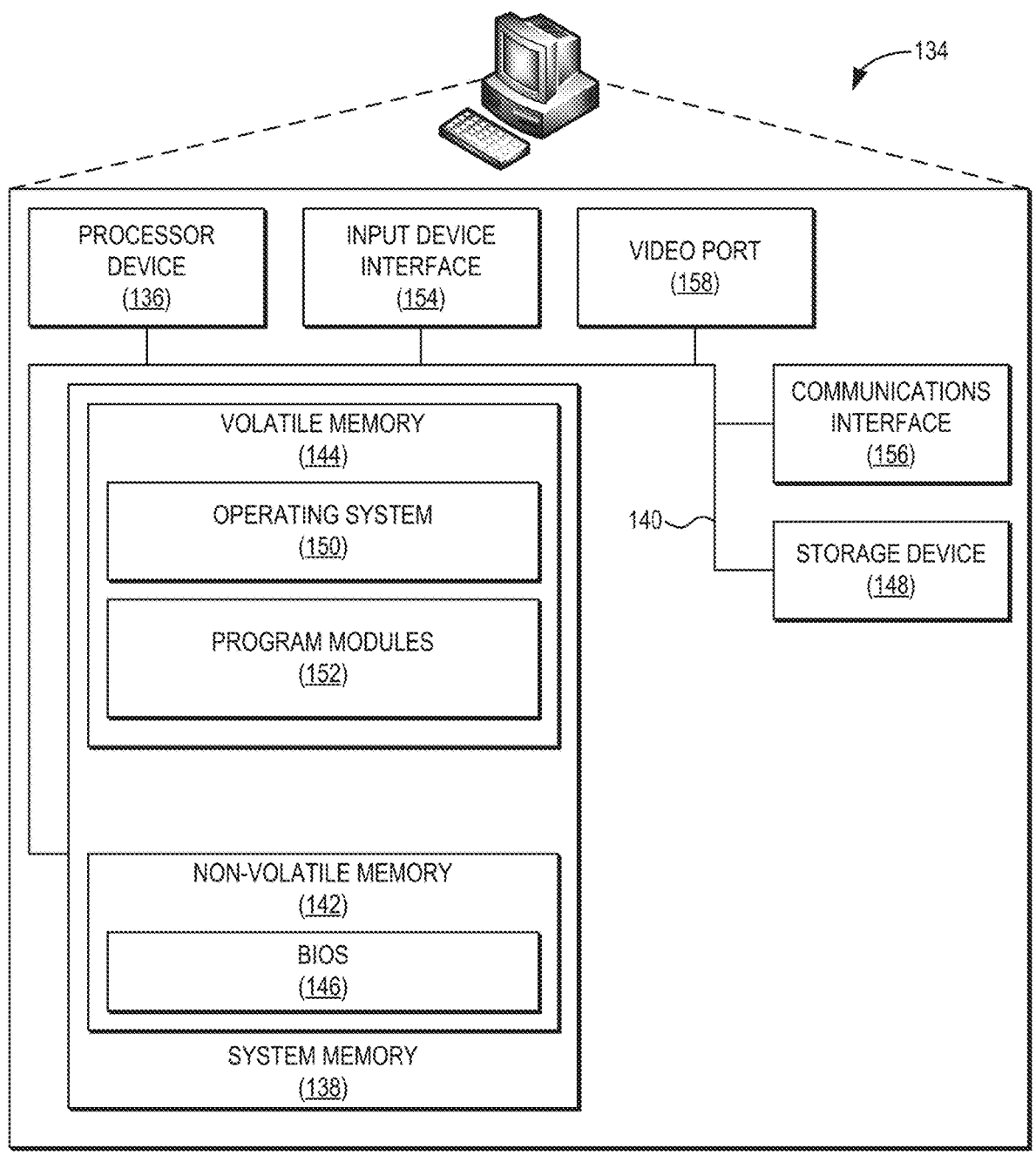
FIG. 5 is a block diagram of a classical computing device suitable for implementing examples, according to one example.

FIG. 5 is a block diagram of a processor-based computing device 134 ("computing device 134" or "classical computing device 134"), such as the classical computing device 18 of FIG. 1, suitable for implementing examples according to one example. The computing device 134 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 134 includes a processor device 136, a system memory 138, and a system bus 140. The system bus 140 provides an interface for system components including, but not limited to, the system memory 138 and the processor device 136. The processor device 136 can be any commercially available or proprietary processor.

The system bus 140 may be any of several types of bus structures that may further interconnect to a memory bus (with or without a memory controller), a peripheral bus, and/or a local bus using any of a variety of commercially available bus architectures. The system memory 138 may include non-volatile memory 142 (e.g., read-only memory (ROM), erasable programmable ROM (EPROM), electrically EPROM (EEPROM), etc.), and volatile memory 144 (e.g., RAM). A basic input/output system (BIOS) 146 may be stored in the non-volatile memory 142 and can include the basic routines that help to transfer information among elements within the computing device 134. The volatile memory 144 may also include a high-speed RAM, such as static RAM, for caching data.

The computing device 134 may further include or be coupled to a non-transitory computer-readable storage medium such as a storage device 148, which may comprise, for example, an internal or external hard disk drive (HDD) (e.g., enhanced integrated drive electronics (EIDE) or serial advanced technology attachment (SATA)), for storage, flash memory, or the like. The storage device 148 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 148 and in the volatile memory 144, including an operating system 150 and one or more program modules 152 which may implement the functionality described herein in whole or in part. It is to be appreciated that the examples can be implemented with various commercially available operating systems 150 or combinations of operating systems 150. All or a portion of the examples may be implemented as a computer program product stored on a transitory or non-transitory computer-usable or computer-readable storage medium, such as the storage device 148, which includes complex programming instructions, such as complex computer-readable program code, to cause the processor device 136 to carry out the steps described herein. Thus, the computer-readable program code can comprise software instructions for implementing the functionality of the examples described herein when executed on the processor device 136. The processor device 136 may serve as a controller, or control system, for the computing device 134 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 136 through an input device interface 154 that is coupled to the system bus 140 but can be connected by other interfaces, such as a parallel port, an Institute of Electrical and Electronic Engineers (IEEE) 1394 serial port, a Universal Serial Bus (USB) port, an IR interface, and the like.

The computing device 134 may also include a communications interface 156 suitable for communicating with a network as appropriate or desired. The computing device 134 may also include a video port 158 to interface with a display device to provide information to a user.

Figure 6:
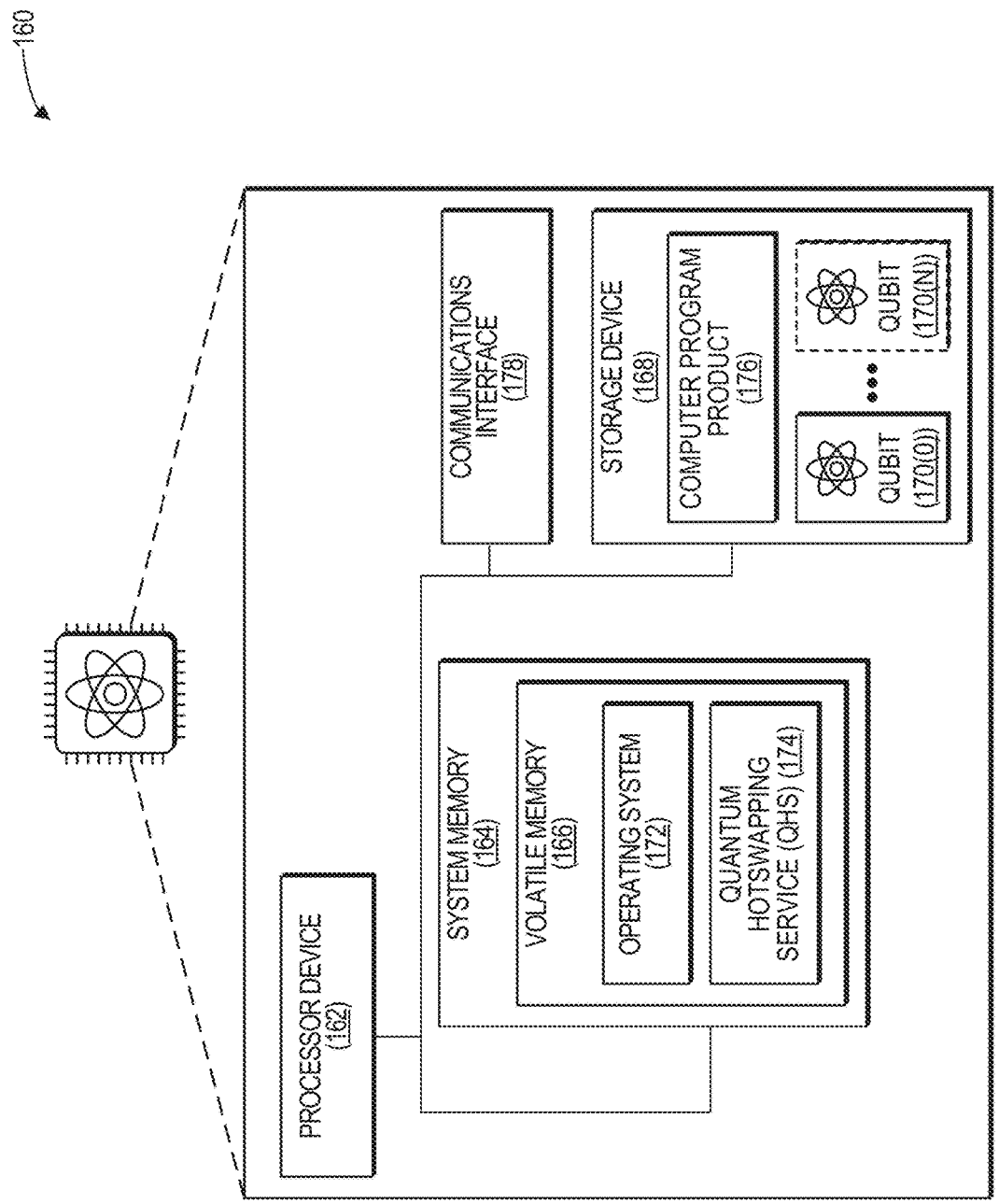
FIG. 6 is a block diagram of a quantum computing device suitable for implementing examples, according to one example.

FIG. 6 is a block diagram of a quantum computing device 160, such as the quantum computing device 12 of FIG. 1, suitable for implementing examples according to one example. The quantum computing device 160 may comprise any suitable quantum computing device or devices. The quantum computing device 160 can operate using classical computing principles or quantum computing principles. When using quantum computing principles, the quantum computing device 160 performs computations that utilize quantum-mechanical phenomena, such as superposition and entanglement. The quantum computing device 160 may operate under certain environmental conditions, such as at or near zero degrees (0°) Kelvin. When using classical computing principles, the quantum computing device 160 utilizes binary digits that have a value of either zero (0) or one (1).

The quantum computing device 160 includes a processor device 162 and a system memory 164. The processor device 162 can be any commercially available or proprietary processor suitable for operating in a quantum environment. The system memory 164 may include volatile memory 166 (e.g., random-access memory (RAM)). The quantum computing device 160 may further include or be coupled to a non-transitory computer-readable medium such as a storage device 168. The storage device 168 and other drives associated with computer-readable media and computer-usable media may provide non-volatile storage of data, data structures, computer-executable instructions, and the like. The storage device may also provide functionality for storing one or more qubits 170(0)-170(N).

A number of modules can be stored in the storage device 168 and in the volatile memory 166, including an operating system 172 and one or more modules, such as a QHS 174. All or a portion of the examples may be implemented as a computer program product 176 stored on a transitory or non-transitory computer-usable or computer-readable medium, such as the storage device 168, which includes complex programming instructions, such as complex computer-readable program code, to cause the processor device 162 to carry out the steps described herein. Thus, the computer-readable program code can comprise computer-executable instructions for implementing the functionality of the examples described herein when executed on the processor device 162.

An operator may also be able to enter one or more configuration commands through a keyboard (not illustrated), a pointing device such as a mouse (not illustrated), or a touch-sensitive surface such as a display device (not illustrated). The quantum computing device 160 may also include a communications interface 178 suitable for communicating with other quantum computing systems, including, in some implementations, classical computing devices.

Individuals will recognize improvements and modifications to the preferred examples of the disclosure. All such improvements and modifications are considered within the scope of the concepts disclosed herein and the claims that follow.

What is claimed is:

1. A method, comprising
   executing, by a quantum computing device, a first quantum service comprising one or more qubits;
   receiving, from a quantum service scheduler, a first request to allow a second quantum service to access the one or more qubits; and
   responsive to receiving the first request:
      suspending execution of the first quantum service;
      exporting first metadata representing a first state of each qubit of the one or more qubits to a classical computing device;
      allocating the one or more qubits to the second quantum service; and
      executing the second quantum service.

2. The method of claim 1, wherein the first metadata comprises one or more of:
   one or more identifiers of respective ones of the one or more qubits; and
   one or more data values stored by respective ones of the one or more qubits.

3. The method of claim 1, wherein suspending execution of the first quantum service comprises determining that the first quantum service has completed all operations using the one or more qubits.

4. The method of claim 1, further comprising:
   receiving, from the quantum service scheduler, a second request to allow the first quantum service to resume access to the one or more qubits; and
   responsive to receiving the second request:
      suspending execution of the second quantum service;
      exporting second metadata representing a second state of each qubit of the one or more qubits to the classical computing device;
      importing, from the classical computing device, the first metadata;
      restoring the first state of each qubit of the one or more qubits based on the first metadata;
      allocating the one or more qubits to the first quantum service; and
      resuming execution of the first quantum service.

5. The method of claim 4, wherein restoring the first state of each qubit of the one or more qubits based on the first metadata comprises:
   retrieving one or more data values from the first metadata; and
   storing the one or more data values in respective ones of the one or more qubits based on the first metadata.

6. The method of claim 4, wherein suspending execution of the second quantum service comprises determining that the second quantum service has completed all operations using the one or more qubits.

7. The method of claim 1, further comprising determining that the one or more qubits are not in a state of entanglement.

8. A quantum computing device, comprising:
   a system memory; and
   a processor device communicatively coupled to the system memory, the processor device to:
      execute a first quantum service comprising one or more qubits;
      receive, from a quantum service scheduler, a first request to allow a second quantum service to access the one or more qubits; and
      responsive to receiving the first request:
         suspend execution of the first quantum service;
         export first metadata representing a first state of each qubit of the one or more qubits to a classical computing device;
         allocate the one or more qubits to the second quantum service; and
         execute the second quantum service.

9. The quantum computing device of claim 8, wherein the first metadata comprises one or more of:
   one or more identifiers of respective ones of the one or more qubits; and
   one or more data values stored by respective ones of the one or more qubits.

10. The quantum computing device of claim 8, wherein to suspend execution of the first quantum service is to determine that the first quantum service has completed all operations using the one or more qubits.

11. The quantum computing device of claim 8, wherein the processor device is further to:
    receive, from the quantum service scheduler, a second request to allow the first quantum service to resume access to the one or more qubits; and
    responsive to receiving the second request:
       suspend execution of the second quantum service;
       export second metadata representing a second state of each qubit of the one or more qubits to the classical computing device;
       import, from the classical computing device, the first metadata;
       restore the first state of each qubit of the one or more qubits based on the first metadata;
       allocate the one or more qubits to the first quantum service; and
       resume execution of the first quantum service.

12. The quantum computing device of claim 11, wherein to restore the first state of each qubit of the one or more qubits based on the first metadata is to:
    retrieve one or more data values from the first metadata; and
    store the one or more data values in respective ones of the one or more qubits based on the first metadata.

13. The quantum computing device of claim 11, wherein to suspend execution of the second quantum service is to determine that the second quantum service has completed all operations using the one or more qubits.

14. The quantum computing device of claim 8, wherein the processor device is further to determine that the one or more qubits are not in a state of entanglement.

15. A non-transitory computer-readable medium having stored thereon computer-executable instructions that, when executed, cause one or more processor devices to:
    execute a first quantum service comprising one or more qubits;

receive, from a quantum service scheduler, a first request to allow a second quantum service to access the one or more qubits; and responsive to receiving the first request:
    suspend execution of the first quantum service;
    export first metadata representing a first state of each qubit of the one or more qubits to a classical computing device;
    allocate the one or more qubits to the second quantum service; and
    execute the second quantum service.

16. The non-transitory computer-readable medium of claim 15, wherein the first metadata comprises one or more of:
    one or more identifiers of respective ones of the one or more qubits; and
    one or more data values stored by respective ones of the one or more qubits.

17. The non-transitory computer-readable medium of claim 15, wherein to suspend execution of the first quantum service is to determine that the first quantum service has completed all operations using the one or more qubits.

18. The non-transitory computer-readable medium of claim 15, wherein the computer-executable instructions further cause the one or more processor devices to:
    receive, from the quantum service scheduler, a second request to allow the first quantum service to resume access to the one or more qubits; and
    responsive to receiving the second request:
        suspend execution of the second quantum service;
        export second metadata representing a second state of each qubit of the one or more qubits to the classical computing device;
        import, from the classical computing device, the first metadata;
        restore the first state of each qubit of the one or more qubits based on the first metadata;
        allocate the one or more qubits to the first quantum service; and
        resume execution of the first quantum service.

19. The non-transitory computer-readable medium of claim 18, wherein to restore the first state of each qubit of the one or more qubits based on the first metadata is to:
    retrieve one or more data values from the first metadata; and
    store the one or more data values in respective ones of the one or more qubits based on the first metadata.

20. The non-transitory computer-readable medium of claim 18, wherein to suspend execution of the second quantum service is to determine that the second quantum service has completed all operations using the one or more qubits.

* * * * *